United States Patent
Vasudevan et al.

(10) Patent No.: US 11,663,410 B2
(45) Date of Patent: May 30, 2023

(54) ONLINE TERMS OF USE INTERPRETATION AND SUMMARIZATION

(71) Applicant: KYNDRYL, INC., New York, NY (US)

(72) Inventors: Sreeram Vasudevan, Singapore (SG); Lorinne Yoong, Singapore (SG); Monisha Oberoi, Singapore (SG)

(73) Assignee: KYNDRYL, INC., New York, NY (US)

( * ) Notice: Subject to any disclaimer, the term of this patent is extended or adjusted under 35 U.S.C. 154(b) by 114 days.

(21) Appl. No.: 17/177,413

(22) Filed: Feb. 17, 2021

(65) Prior Publication Data
US 2022/0261544 A1    Aug. 18, 2022

(51) Int. Cl.
*G06F 17/00*        (2019.01)
*G06F 40/289*       (2020.01)
*G06F 40/194*       (2020.01)
*G06F 16/387*       (2019.01)
(Continued)

(52) U.S. Cl.
CPC ............ *G06F 40/289* (2020.01); *G06F 16/35* (2019.01); *G06F 16/387* (2019.01); *G06F 40/194* (2020.01); *G06Q 50/18* (2013.01)

(58) Field of Classification Search
CPC ...... G06F 40/289; G06F 16/35; G06F 16/387; G06F 40/194; G06F 40/279; G06F 40/30; G06Q 50/18
See application file for complete search history.

(56) References Cited

U.S. PATENT DOCUMENTS

| 7,610,391 B2 | 10/2009 | Dunn |
| 7,925,993 B2 | 4/2011 | Williams |
| 8,719,366 B2 | 5/2014 | Mathew |

(Continued)

FOREIGN PATENT DOCUMENTS

EP    3422269 A1    1/2019

OTHER PUBLICATIONS

Luger, Ewa, Stuart Moran, and Tom Rodden. "Consent for all: revealing the hidden complexity of terms and conditions." Proceedings of the SIGCHI conference on Human factors in computing systems. 2013 (Year: 2013).*

(Continued)

*Primary Examiner* — Andrew T McIntosh
(74) *Attorney, Agent, or Firm* — Erik C. Swanson, Esq.; Blanche E. Schiller, Esq.; Heslin Rothenberg Farley & Mesiti P.C.

(57) ABSTRACT

In an approach to interpreting and summarizing online terms of use, a computer receives a terms of use agreement from a data source and a request for interpretation of the terms of use agreement from a user. A computer categorizes the terms of use agreement into one or more categories based on a type of data source of the terms of use agreement. A computer ranks one or more words in the terms of use agreement based on the categorization and on one or more additional terms of use agreements of the type of data source. A computer generates a summary of the terms of use agreement based on the ranking. A computer displays the summary of the terms of use agreement to the user. A computer receives input from the user associated with consent to the terms of use agreement. A computer stores the input.

20 Claims, 5 Drawing Sheets

(51) Int. Cl.
*G06F 16/35* (2019.01)
*G06Q 50/18* (2012.01)

(56) References Cited

U.S. PATENT DOCUMENTS

| | | | |
|---|---|---|---|
| 8,788,523 | B2 | 7/2014 | Martin |
| 10,706,176 | B2 | 7/2020 | Brannon |
| 2003/0074345 | A1* | 4/2003 | Baldwin ............... G06F 40/143 |
| 2005/0022106 | A1* | 1/2005 | Kawai .................... G06F 16/35 715/233 |
| 2010/0268528 | A1 | 10/2010 | Raskina |
| 2011/0197121 | A1 | 8/2011 | Kletter |
| 2013/0067598 | A1* | 3/2013 | Da Palma ............. G06F 21/121 726/29 |
| 2014/0101171 | A1 | 4/2014 | Danielyan |
| 2014/0156614 | A1* | 6/2014 | Krappe ................. G06F 16/122 707/694 |
| 2015/0032645 | A1 | 1/2015 | McKeown |
| 2015/0370768 | A1 | 12/2015 | Tigchelaar |
| 2020/0004986 | A1 | 1/2020 | Brannon |
| 2020/0143384 | A1 | 5/2020 | Koontz |
| 2020/0272764 | A1 | 8/2020 | Brannon |
| 2021/0119811 | A1* | 4/2021 | Johnson ................ H04L 9/3213 |
| 2021/0125297 | A1* | 4/2021 | Doran ................... G06F 40/289 |

OTHER PUBLICATIONS

Bashir, Masooda, et al. "Online privacy and informed consent: The dilemma of information asymmetry." Proceedings of the Association for Information Science and Technology 52.1 (2015) (Year: 2015).*

Manor, Laura, and Junyi Jessy Li. "Plain English summarization of contracts." arXiv preprint arXiv:1906.00424 (2019) (Year: 2019).*

* cited by examiner

ONLINE TERMS OF USE INTERPRETATION AND SUMMARIZATION

BACKGROUND OF THE INVENTION

The present invention relates generally to the field of natural language processing, and more particularly to interpreting and summarizing online terms of use.

Natural language processing (NLP) is a field of computer science, artificial intelligence, and linguistics concerned with the interactions between computers and human (natural) languages. As such, natural language processing is related to the area of human-computer interaction. Many challenges in natural language processing involve natural language understanding, that is, enabling computers to derive meaning from human or natural language input.

Text Classification is the process of assigning categories (tags) to unstructured text data. This essential task of NLP makes it easy to organize and structure complex text, converting the text to meaningful data. Tasks of text classification include, but are not limited to, topic analysis, sentiment analysis, language detection, and intent detection. Topic analysis provides an understanding of the main themes or subjects of a text and is one way of organizing text data. Sentiment analysis refers to the use of natural language processing, text analysis, computational linguistics, and biometrics to systematically identify, extract, quantify, and study affective states and subjective information. Language detection enables classification of a text based on its language. One of the most useful applications of language detection is automatically routing information to the right geographically located legal framework. Intent detection uses a text classifier to automatically recognize the intentions or the purpose behind a text. This can be particularly useful when analyzing data before the data is approved.

Text mining is the use of one or more techniques to cluster textual data. The techniques include, but are not limited to, word frequency, collocation, and concordance. Word frequency can be used to identify the most recurrent terms or concepts in a set of data. Collocation refers to a sequence of words that commonly appear near each other. The most common types of collocations are bigrams (a pair of words that are likely to go together) and trigrams (a combination of three words). Identifying collocations, and counting them as a single word, improves the granularity of the text, allows a better understanding of its semantic structure and, in the end, leads to more accurate text mining results. Concordance is used to recognize the context or instance in which a word or set of words appears. Natural language can be ambiguous; the same word can be used in many different contexts. Analyzing the concordance of a word can help understand its exact meaning based on context.

SUMMARY

Embodiments of the present invention disclose a computer-implemented method, a computer program product, and a system for interpreting and summarizing online terms of use. The computer-implemented method may include one or more computer processors receiving a terms of use agreement from a data source and a request for interpretation of the terms of use agreement from a user, wherein the terms of use agreement requires consent from the user. One or more computer processors categorize the terms of use agreement into one or more categories based on a type of data source of the terms of use agreement. One or more computer processors rank one or more words in the terms of use agreement based on the categorization and on one or more additional terms of use agreements of the type of data source. One or more computer processors generate a summary of the terms of use agreement based on the ranking. One or more computer processors display the summary of the terms of use agreement to the user. One or more computer processors receive input from the user associated with consent to the terms of use agreement. One or more computer processors store the input.

DETAILED DESCRIPTION

Figure 1:
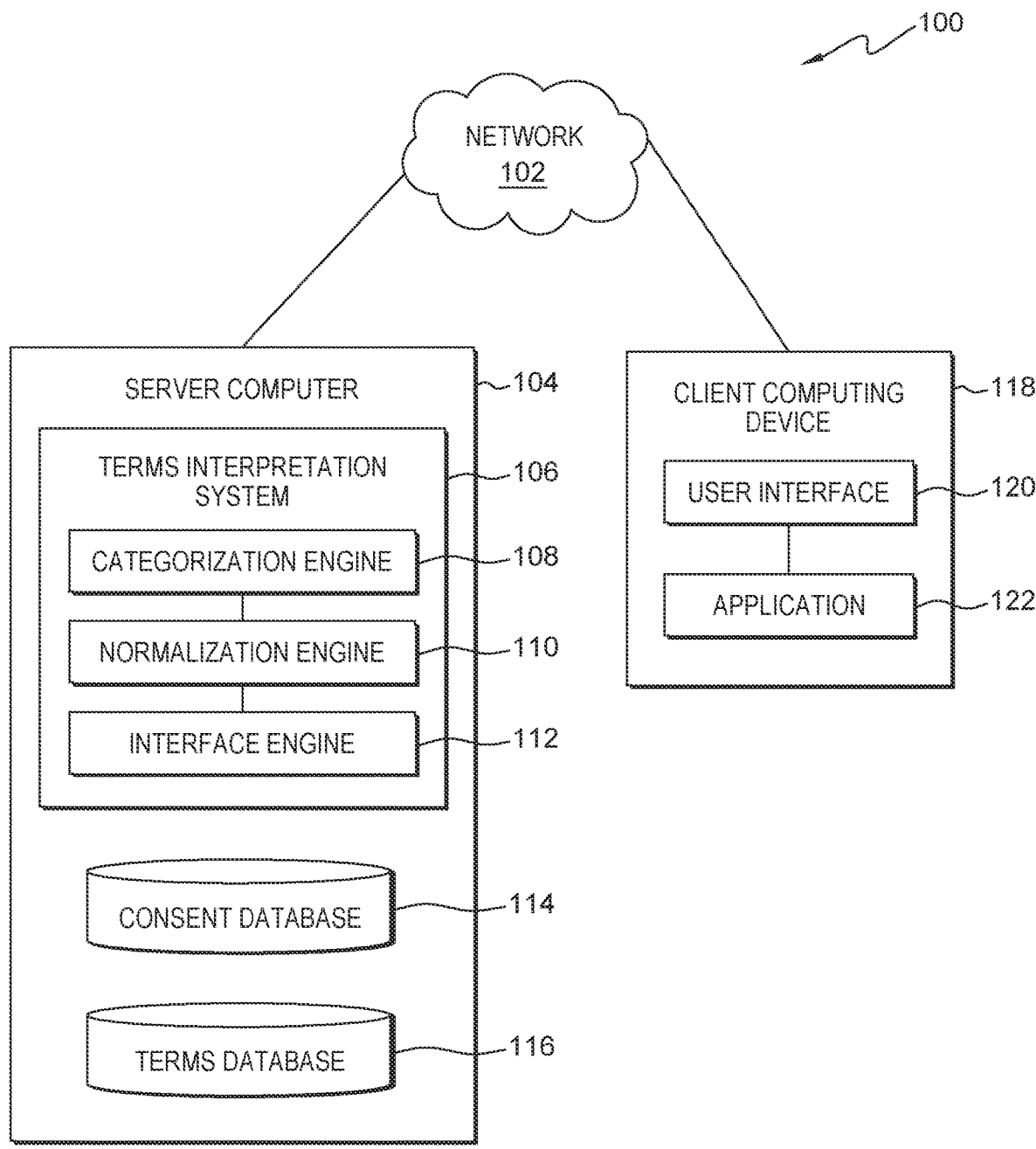
FIG. 1 is a functional block diagram illustrating a distributed data processing environment, in accordance with an embodiment of the present invention.

Online services have expanded dramatically worldwide and will continue to be a mainstay of daily life, such as play at home streaming entertainment services, online education, online commerce, etc. In order to use an online service via an application ("app"), software, or other digital platform, the end user is often asked to consent to online terms of use or other terms and conditions associated with the platform. The terms may include a privacy policy, legal disclaimers, service contract terms, or other terms and conditions. In practice, online experience indicates that many end users do not find it convenient to undertake a meaningful substantive review of the terms of use before obtaining online access, which often means that end users provide consent without proper understanding of what the end users are consenting to. The terms of use are often lengthy and complex, sometimes in non-native language, resulting in the end users not reviewing the terms properly, or even at all, prior to providing consent, hence they are not providing informed consent. Furthermore, the online service provider typically revises its terms of use regularly. When end users are asked to consent to the revised policy, they are typically not provided with a summary of the changes to the previous terms of use (and the previous terms of use would be inaccessible to the end user), which is important information to providing consent to the revised terms of use. In addition, increased proliferation of service providers may lead to end users wishing to terminate from one service provider to switch to another, and the service provider's terms of use can be one point of comparison that end users can use in that determination.

Many countries, and states within the United States, are implementing privacy regulations that include a requirement for informed consent by the end user to the use of the end user's personal data, for example, the General Data Protection Regulation (GDPR) in Europe and the California Consumer Protection Act (CCPA) which are targeted toward privacy of data of individuals. While different countries' laws may differ in the degree of requirement of user consent, around the world, large populations are using online services in an environment of heightened awareness of an individual's rights to personal data. The proliferation of online services can translate into increased data regulatory scrutiny around the world on the provisioning of meaningful informed consent to end users. With the further proliferation of new technologies, such as the Internet of Things, that require large amounts of personal data to be involved, regulatory scrutiny will continue to intensify.

Embodiments of the present invention recognize that the end user experience with online consent to terms of use can be improved by providing a system that provides end users with the ability to make a quick review, in a preferred language, to make an informed decision with respect to consent to terms of use, and to exercise the data rights consent of the user online in a meaningful way. Embodiments of the present invention provide a system with the ability to learn from multiple data sources and multiple laws and regulations that are applicable to an end user prior to the end user accepting enrollment into a digital platform. Implementation of embodiments of the invention may take a variety of forms, and exemplary implementation details are discussed subsequently with reference to the Figures.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 118 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 118, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 118 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes terms interpretation system 106, consent database 114, and terms database 116. Server computer 104 may include internal and external hardware components, as depicted and described in further detail with respect to FIG. 4.

Terms interpretation system 106 interprets online terms of use by determining key areas of focus, summarizing, and displaying the summarized terms to the end user in an easy to understand, preferred language. As used herein, "terms" refers to one or more of: terms of use, terms of use agreements, terms and conditions, use policies, privacy policies, policy agreements, legal disclaimers, online terms, and digital terms. Terms interpretation system 106 also compares terms between a revised version and a previous version of the terms and conditions and summarizes the differences in a snapshot display in the easy to understand language. In addition, terms interpretation system 106 compares the terms concerned with (a) regulatory requirements, (b) other service providers, and/or (c) generally accepted terms and then summarizes the differences. Further, terms interpretation system 106 uses in-country laws, legislation, regulations, and information available on the legal terms and generates a direct data correlation of the legal requirements to the provided terms of use with respect to current geographical location, as would be important for the awareness of end user.

Terms interpretation system 106 receives a terms interpretation request. Terms interpretation system 106 determines the geographical location of the user and any applicable laws or requirements associated with the geographical location. Terms interpretation system 106 determines whether a user has previously consented to terms from the terms originator, and if so, retrieves the previous terms and compares them to the current terms. Terms interpretation system 106 performs categorization and normalization of the terms. Terms interpretation system 106 determines a preferred language for displaying a summary. Terms interpretation system 106 generates a summary. Terms interpretation system 106 displays the summary to the user. Terms interpretation system 106 receives user input associated with the summary and stores the input. Terms interpretation system 106 includes categorization engine 108, normalization engine 110, and interface engine 112. Terms interpretation system 106 is depicted and described in further detail with respect to FIG. 2.

Categorization engine 108 performs text classification to determine which category, or bucket, to which the current terms belong. Categorization engine 108 takes input from various data sources and performs data classification and content determination using one or more techniques, as would be recognized by a person of skill in the art, to categorize the terms into clusters. For example, categorization engine 108 may use techniques such as topic analysis, intent detection, etc. Examples of data sources include, but are not limited to, gaming software, music streaming software, video streaming software, hardware, application servers, and middleware. In the depicted embodiment, categorization engine 108 is a separate component of terms interpretation system 106. In another embodiment, the function of categorization engine 108 is integrated into terms interpretation system 106.

Normalization engine 110 takes the output from categorization engine 108, i.e., the current terms and other terms in the same category/cluster, and creates a ranking of words and/or phrases in the terms from which terms interpretation system 106 can generate a summary. Normalization engine 110 performs a second round of clustering by choosing an appropriate centroid, as would be recognized by a person of skill in the art. In an embodiment, normalization engine 110 uses one or more techniques of bi-clustering and/or co-clustering. These techniques are capable of extracting relevant information from data and may be used with text classification by applying one or more similarity criteria simultaneously to rows and columns of data matrices. This technique accomplishes creation of cluster objects and attributes, enabling the discovery of bi-clusters or co-clusters, from text classification, as would be recognized by a person of skill in the art. Normalization engine 110 uses the clusters to identify patterns for consent similarity. Normalization engine 110 derives a plot based on a normalized distribution of the clusters. For example, normalization engine 110 may utilize a Z-distribution, a chi-squared distribution, or other techniques, as would be recognized by a person of skill in the art. Normalization engine 110 then uses an estimation technique, such as a Bayesian estimator, to derive a hierarchical cluster, which is more structured than the initial clusters and provides ease of use. Normalization engine 110 then uses a text analysis model, such as text mining and/or text classification, coupled with sentiment analysis, to analyze and rank the words and/or phrases in the terms to highlight as being important for the user to review. As would be recognized by a person of skill in the art, in sentiment analysis, a score is computed between −1 to +1. More positive, or impactful, words approach +1 and words with a negative connotation approach −1, i.e., the more negative, or unaffecting, a word is, the lower the score. For example, the sentiment analysis can detect words such as "strongly advise" in the terms and attribute a higher score to those words versus words such as "recommend." In the depicted embodiment, normalization engine 110 is a separate component of terms interpretation system 106. In another embodiment, the function of normalization engine 110 is integrated into terms interpretation system 106.

Interface engine 112 is responsible for displaying a summary of the terms to the user in a comprehensible format, based on the inputs received after categorization and normalization, respectively, i.e., the ranking of words and/or phrases in the terms. Interface engine 112 takes the output from normalization engine 110 and generates a summary of the terms for the user of client computing device 118. Interface engine 112 determines which words and/or phrases from the terms, or changes from previous terms, to highlight to the user to enable informed consent. Interface engine 112 considers the location of the user and the preferred language of the user for generation of the summary. In the depicted embodiment, interface engine 112 is a separate component of terms interpretation system 106. In another embodiment, the function of interface engine 112 is integrated into terms interpretation system 106.

Consent database 114 and terms database 116 each store information used by terms interpretation system 106. In addition, consent database 114 stores information generated by terms interpretation system 106. In the depicted embodiment, consent database 114 and terms database 116 reside on server computer 104. In another embodiment, consent database 114 and terms database 116 may each reside elsewhere within distributed data processing environment 100, provided that terms interpretation system 106 has access to consent database 114 and terms database 116. A database is an organized collection of data. Consent database 114 and terms database 116 can each be implemented with any type of storage device capable of storing data and configuration files that can be accessed and utilized by terms interpretation system 106, such as a database server, a hard disk drive, or a flash memory.

Consent database 114 represents one or more databases that store historical records of consent agreed to, or declined, by the user of client computing device 118 for one or more hardware or software applications that require consent to terms and conditions for use and the associated terms. Consent database 114 also stores information generated by categorization engine 108, normalization engine 110, and interface engine 112. Consent database 114 also stores user preferences associated with agreement to terms, including a preferred language for presentation of a terms summary.

Terms database 116 represents one or more databases that store terms of use and/or terms and conditions associated with the one or more hardware or software applications. In an embodiment, terms database 116 includes a different database for each data source. Terms database 116 may also store a plurality of laws and regulations associated with privacy and personal data for a plurality of geographic locations.

The present invention may contain various accessible data sources, such as consent database 114 and terms database 116, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Terms interpretation system 106 enables the authorized and secure processing of personal data. Terms interpretation system 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Terms interpretation system 106 provides information regarding personal data and the nature (e.g., type, scope, purpose, duration, etc.) of the processing. Terms interpretation system 106 provides the user with copies of stored personal data. Terms interpretation system 106 allows the correction or completion of incorrect or incomplete personal data. Terms interpretation system 106 allows the immediate deletion of personal data.

Client computing device 118 can be one or more of a laptop computer, a tablet computer, a smart phone, smart watch, a smart speaker, or any programmable electronic device capable of communicating with various components and devices within distributed data processing environment 100, via network 102. Client computing device 118 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch. In an embodiment, client computing device 118 may be integrated into a vehicle of the user. For example, client computing device 118 may include a heads-up display in the windshield of the vehicle. In general, client computing device 118 represents one or more programmable electronic devices or combination of programmable electronic devices capable of executing machine readable program instructions and communicating with other computing devices (not shown) within distributed data processing environment 100 via a network, such as network 102. Client computing device 118 includes an instance of user interface 120 and application 122.

User interface 120 provides an interface between term interpretation system 106 on server computer 104 and a user of client computing device 118. In one embodiment, user interface 120 is mobile application software. Mobile application software, or an "app," is a computer program designed to run on smart phones, tablet computers and other mobile devices. In one embodiment, user interface 120 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 120 enables a user of client computing device 118 to interact with terms interpretation system 106 to view summaries of terms. User interface 120 enables a user of client computing device 118 to input "an informed decision" associated with an acceptance or a refusal of the terms of use presented by one or more hardware or software applications. User interface 120 is depicted and described in further detail with respect to FIG. 3.

Application 122 represents one or more mobile applications, web-based applications, software, such as gaming software, music streaming software, and video streaming software, hardware, application servers, middleware, etc. that require a user to consent to one or more terms of use, or terms and conditions, prior to providing the user access to the application, software, or hardware.

Figure 2:
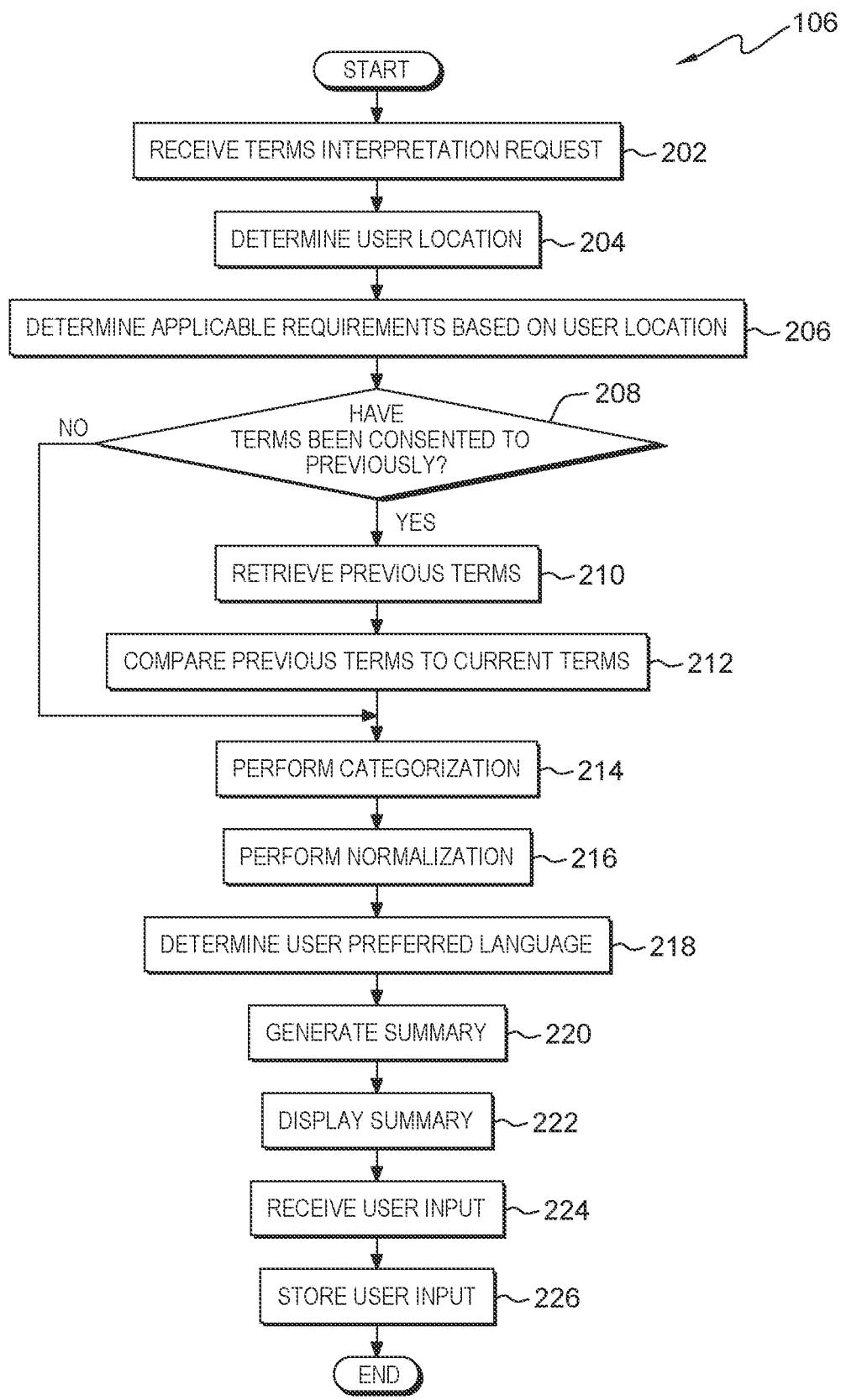
FIG. 2 is a flowchart depicting operational steps of a terms interpretation system, on a server computer within the distributed data processing environment of FIG. 1, for interpreting and summarizing online terms of use, in accordance with an embodiment of the present invention.

FIG. 2 is a flowchart depicting operational steps of terms interpretation system 106, on server computer 104 within distributed data processing environment 100 of FIG. 1, for interpreting and summarizing online terms of use, in accordance with an embodiment of the present invention.

Terms interpretation system 106 receives a request for terms interpretation (step 202). In an embodiment, when a user of client computing device 118 is presented terms by an entity, for example, application 122, terms interpretation system 106 receives the terms and a request for interpretation of the terms from the user. In one embodiment, terms interpretation system 106 receives the request when the user clicks a button to trigger the terms interpretation. For example, when terms interpretation system 106 recognizes that a terms of use for an application is being displayed/viewed, via user interface 120, terms interpretation system 106 presents a button associated with the display of the terms, via user interface 120, labelled "terms interpreter" for the user to click, as will be described with respect to FIG. 3A. In another embodiment, for example, if the user receives the terms in an email, the user may trigger terms interpretation system 106 directly, via user interface 120. In an embodiment, as part of the request receipt, terms interpretation system 106 determines the platform upon which the user received the presentation of terms. For example, terms interpretation system 106 determines application 122 is a web-based application, i.e., a website. In another example, terms interpretation system 106 determines that application 122 is a mobile application. Further, terms interpretation system 106 determines the type of device on which the terms are presented to the user. For example, terms interpretation system 106 determines whether client computing device 118 is a hand-held mobile device or a laptop.

Terms interpretation system 106 determines the location of the user (step 204). In an embodiment, terms interpretation system 106 determines the geographic location of the user of client computing device 118 via one or more techniques known in the art. For example, in an embodiment where client computing device 118 include global positioning system (GPS) sensors, terms interpretation system 106 can determine the location of client computing device 118, and therefore the location of the user, by utilizing GPS coordinates. In an embodiment, terms interpretation system 106 utilizes interface engine 112 to determine the location of the user.

Terms interpretation system 106 determines applicable requirements based on the location of the user (step 206). In an embodiment, based on the determined geographic location of the user, terms interpretation system 106 determines any laws, regulations, and/or requirements applicable to the presented terms. For example, many geographic regions have privacy laws associated with access to personal data. Examples of geographic privacy laws include the California Consumer Privacy Act for a California resident, the General Data Protection Regulation (GDPR) for a resident of Europe, and the General Data Protection Law for a resident of Brazil. Prior to interpreting the terms for the user, terms interpretation system 106 determines whether any geographic requirements may be associated with the presented terms. In an embodiment, terms interpretation system 106 utilizes categorization engine 108 to determine whether there are any applicable requirements based on the location of the user.

Terms interpretation system 106 determines whether the terms have been consented to previously (decision block 208). In an embodiment, the terms presented to the user by application 122 may be a new version of terms to which the user has already provided consent. For example, if application 122 is a mobile application, then the user may have previously agreed to terms of use in order to download the application. Periodically, entities may revise the terms of use to, for example, comply with new regulations, update financial responsibility of the user, or to update dates in the terms which may have expired. In an embodiment, terms interpretation system 106 reviews historical consents stored in consent database 114 to determine if the terms have been consented to previously. In an embodiment, terms interpretation system 106 utilizes categorization engine 108 to determine whether the terms have been consented to previously.

If terms interpretation system 106 determines the terms have been consented to previously ("yes" branch, decision block 208), then terms interpretation system 106 retrieves the previous terms (step 210). In an embodiment, if terms interpretation system 106 determines the presented terms are from an entity for which the user previously provided consent, then terms interpretation system 106 retrieves the previous terms from consent database 114.

Terms interpretation system 106 compares the previous terms to the current terms (step 212). In an embodiment, terms interpretation system 106 compares the retrieved terms to the current terms presented by application 122 to determine the differences between the two versions of the terms. Once terms interpretation system 106 makes the comparison, terms interpretation system 106 can highlight any differences between the versions.

Responsive to comparing the previous terms to the current terms, or if terms interpretation system 106 determines the terms have not been consented to previously ("no" branch, decision block 208), then terms interpretation system 106 performs categorization (step 214). In an embodiment, terms interpretation system 106 utilizes categorization engine 108 to perform the categorization. In an embodiment, terms interpretation system 106 retrieves other terms from one or more data sources, such as terms database 116 or any publicly available data source, and categorizes the terms, i.e., puts them into clusters, depending on the type of data source. Examples of data sources include, but are not limited to, gaming software, music streaming software, video streaming software, hardware, application servers, and middleware. In an embodiment, terms interpretation system 106 finds a category that best matches the current terms for addition of the current terms. In an embodiment, terms interpretation system 106 uses one or more text classification techniques to assign the current terms to a category, or bucket, and to form clusters. In an embodiment with previously consented terms, terms interpretation system 106 retrieves one or more terms previously consented to by the user as an input as to which category to add the current terms. In an embodiment, terms interpretation system 106 performs the categorization and outputs clusters of terms using the functions described for categorization engine 108.

Terms interpretation system 106 performs normalization (step 216). In an embodiment, terms interpretation system 106 utilizes normalization engine 110 to perform the normalization process. In an embodiment, terms interpretation system 106 takes the output from the categorization step, i.e., categorized current terms, performs clustering of words and/or phrases in the terms, and derives a plot based on a normalized distribution of the clusters, as described previously. The clustering of the terms may be, for example, groupings of words and/or phrases in the currently presented terms based on the frequency the words and/or phrases are found in the terms. The clustering of the terms may also be, for example, based on a measure of similarity between the terms. In an embodiment, terms interpretation system 106 applies a score, or rank, to each of the clusters, based on which clusters include the most prominent and/or important words and/or phrases in order to choose which parts of the terms to present in a summary. For example, importance may be defined as any changes from a previous version. In another example, importance may be defined as having a high sentiment score. In a further example, importance may be defined by a change in regulations associated with a change in geographical location of the user. In yet another example, importance may be defined as any terms associated with data privacy. In an embodiment, terms interpretation system 106 performs the normalization process using the functions described for normalization engine 110.

Terms interpretation system 106 determines a preferred language of the user (step 218). In an embodiment, terms interpretation system 106 determines a preferred language of the user by one or more techniques. For example, terms interpretation system 106 may retrieve a language preference stored in consent database 114. In another example, terms interpretation system 106 may review contents of one or more emails of the user to determine in which language the user writes a majority of emails or documents. Further, terms interpretation system 106 may distinguish between a language used for professional emails or documents and a language used for personal emails or documents and determine, based on the usage of application 122, which language the user prefers for reading the terms associated with application 122, regardless of the language in which the terms are written.

Terms interpretation system 106 generates a summary (step 220). In an embodiment, based on at least one of the user's location, preferred language, and the important words and/or phrases determined during normalization, terms interpretation system 106 generates a summary of the terms presented by application 122. In an embodiment where the user had consented to terms from application 122 previously, terms interpretation system 106 generates a summary that includes, and highlights, the differences between the two sets of terms. In an embodiment where the location of the user has changed from one privacy law jurisdiction to another since the previous consent to the terms, terms interpretation system 106 includes, and highlights, adaptation of the terms to any location-specific laws or regulations, such as privacy laws, generating a comparison between the location-specific terms. In an embodiment, terms interpretation system 106 selects the contents of the summary by using words and/or phrases that the normalization process scored as important, such as those with a higher sentiment score. In an embodiment, terms interpretation system 106 includes in the summary the words and/or phrases with scores above a pre-defined threshold value. In an embodiment where application 122 is similar to an application previously subscribed to by the user, but from a different entity, such as a competitor service provider, terms interpretation system 106 includes, and highlights, differences between the terms of the two entities. In an embodiment, terms interpretation system 106 includes, and highlights, references to sensitive data, such as personal information. In general, terms interpretation system 106 interprets the currently presented terms and generates a summary of the terms by converting them into a user-friendly, understandable version that the user can easily read and make an informed decision regarding consenting to the terms or not. In an embodiment, terms interpretation system 106 utilizes interface engine 112 to generate the summary. In one embodiment, a user may trigger terms interpretation system 106 to generate a summary of terms that do not require consent in order to quickly view the changes in the terms from a previous version. In an embodiment, terms interpretation system 106 autonomously determines that one or more laws, regulations, etc., associated with the terms have changed and generates a summary of the changes without being prompted by the user, i.e., without receiving a terms interpretation request from the user.

Terms interpretation system 106 displays the summary (step 222). In an embodiment, terms interpretation system 106 displays the generated summary to the user of client computing device 118 via user interface 120. In one embodiment, in addition to the summary, terms interpretation system 106 displays a first button that enables the user to view highlights of the terms. In another embodiment, terms interpretation system 106 displays a second button that enables the user to view changes or differences between the current terms and previous terms. In a further embodiment, terms interpretation system 106 displays a third button to enable the user to provide a decision between accepting the terms or declining the terms. In an embodiment, terms interpretation system 106 utilizes interface engine 112 to display the summary via user interface 120. Examples of the summary display are depicted and described in further detail with respect to FIGS. 3B and 3C.

Terms interpretation system 106 receives user input (step 224). In an embodiment, when the user makes a decision with regards to accepting the terms, terms interpretation system 106, as well as application 122, receives user input. For example, if a user clicks a button displayed by user interface 120 (as depicted in FIG. 3C) to indicate acceptance of the terms, then terms interpretation system 106 receives the user input when the user selects the button. In another example, if the user replies to an email with a response to the presented terms, then terms interpretation system 106 receives the user input.

Terms interpretation system 106 stores user input (step 226). In an embodiment, terms interpretation system 106 stores the received user input and associated terms in consent database 114. Once stored, terms interpretation system 106 can retrieve the input as historical data for use with interpretation of additional terms received by the user.

Figure 3A:
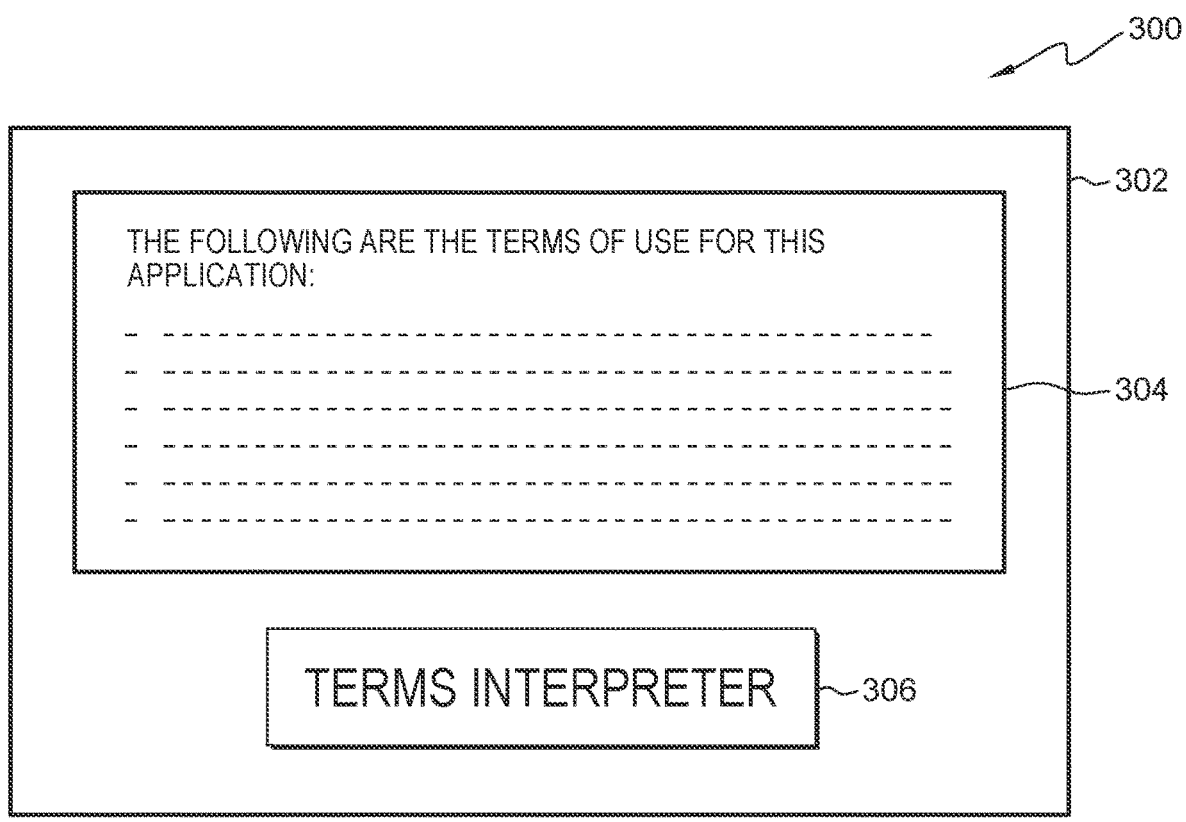
FIG. 3A illustrates an example of a user interface for the terms interpretation system, on a client device within the distributed data processing environment of FIG. 1, for triggering the terms interpretation system, in accordance with an embodiment of the present invention.

FIG. 3A illustrates example 300 of user interface 120 for terms interpretation system 106, on client computing device 118 within distributed data processing environment 100 of FIG. 1, for triggering terms interpretation system 106, in accordance with an embodiment of the present invention. FIG. 3A includes display screen 302 of client computing device 118, terms text box 304, and terms interpreter button 306, as displayed by user interface 120. The user of client computing device 118 triggers terms interpretation system 106 by selecting, i.e., clicking, terms interpreter button 306.

Figure 3B:
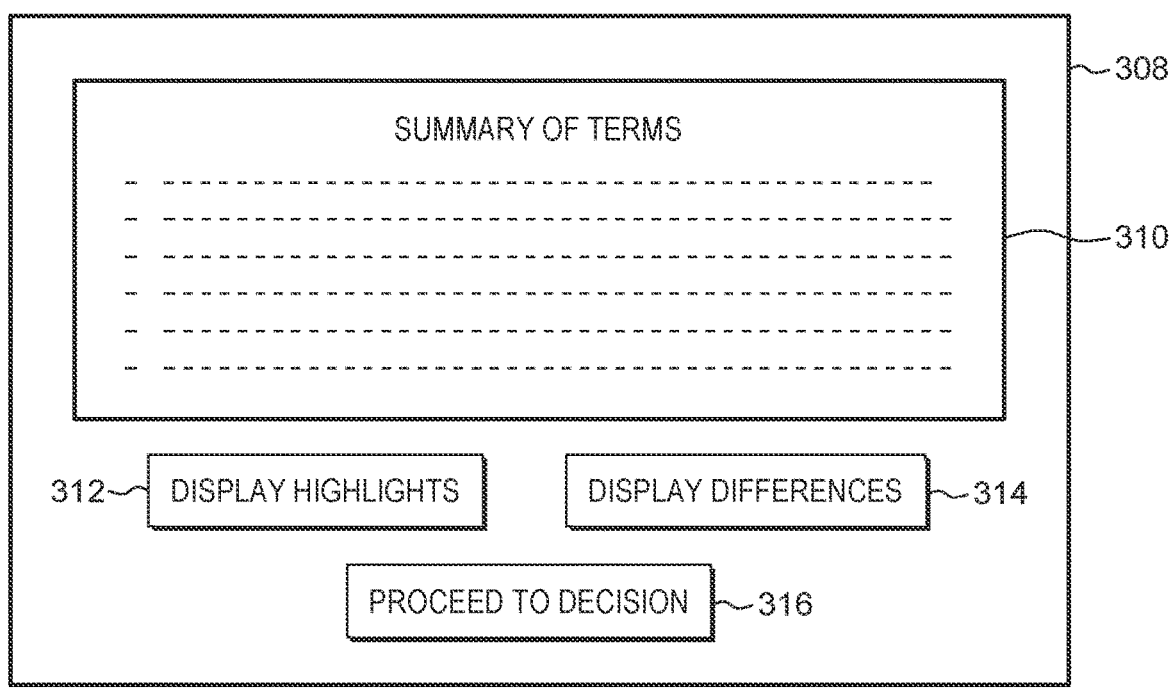
FIG. 3B illustrates an example of the user interface for the terms interpretation system, on the client device within the distributed data processing environment of FIG. 1, for viewing a summary of the terms, in accordance with an embodiment of the present invention.
Figure 3C:
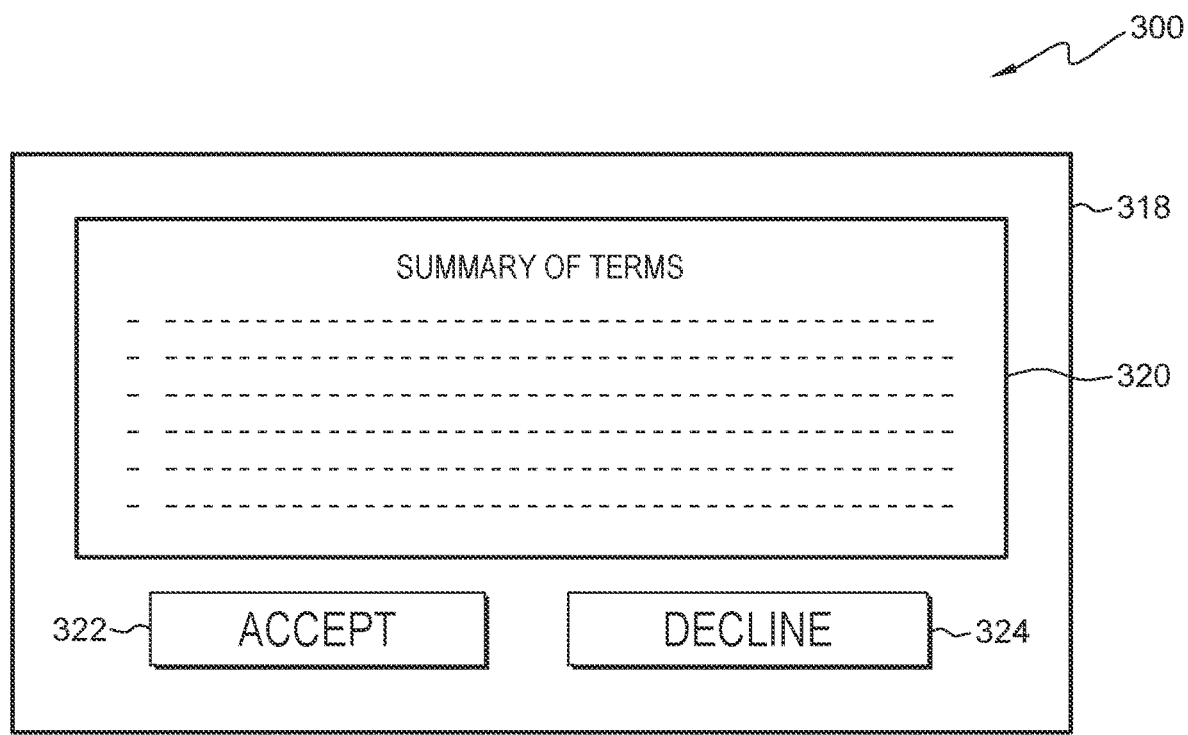
FIG. 3C illustrates an example of the user interface for the terms interpretation system, on the client device within the distributed data processing environment of FIG. 1, for inputting a decision with regards to accepting the terms, in accordance with an embodiment of the present invention.

FIG. 3B illustrates example 300 of user interface 120 for terms interpretation system 106, on client computing device 118 within distributed data processing environment 100 of FIG. 1, for viewing a summary of the terms, in accordance with an embodiment of the present invention. FIG. 3B includes display screen 308, summary of terms text box 310, display highlights button 312, display differences button 314, and proceed to decision button 316, as displayed by user interface 120. As discussed with respect to step 220 of FIG. 2, terms interpretation system 106 generates a summary of the terms in terms text box 304 of FIG. 3A. As discussed with respect to step 222 of FIG. 2, terms interpretation system 106 displays the summary in summary of terms text box 310. In the embodiment of the example in FIG. 3B, the user of client computing device 118 has a choice to trigger terms interpretation system 106 to display highlights of the summary, by selecting i.e., clicking, display highlights button 312. In addition, the user of client computing device 118 has a choice to display differences between the current terms and previous terms by selecting i.e., clicking, display differences button 314. For example, if the user has previously consented to terms of the presenting entity, the user can select display differences button 314 to trigger terms interpretation system 106 to display differences between the versions. In another example, if the currently presented terms are for a similar application from a competitor of an application for which the user has consented to terms in the past, the user can select display differences button 314 to trigger terms interpretation system 106 to display differences between the terms of the two entities. Once the user is satisfied with a review of the summary of the terms, the user can select proceed to decision button 316 to trigger terms interpretation system 106 to enable the user to input a decision regarding the acceptance of the terms.

FIG. 3C illustrates example 300 of user interface 120 for terms interpretation system 106, on client computing device 118 within distributed data processing environment 100 of FIG. 1, for inputting a decision with regards to accepting the terms, in accordance with an embodiment of the present invention. FIG. 3C includes display screen 318, terms summary text box 320, accept button 322, and decline button 324, as displayed by user interface 120. After reviewing the summary, the user selects the appropriate button to communicate a decision with regards to the terms. As discussed with respect to step 224 of FIG. 2, when the user selects either accept button 322 or decline button 324, terms interpretation system 106 receives the user input.

Figure 4:
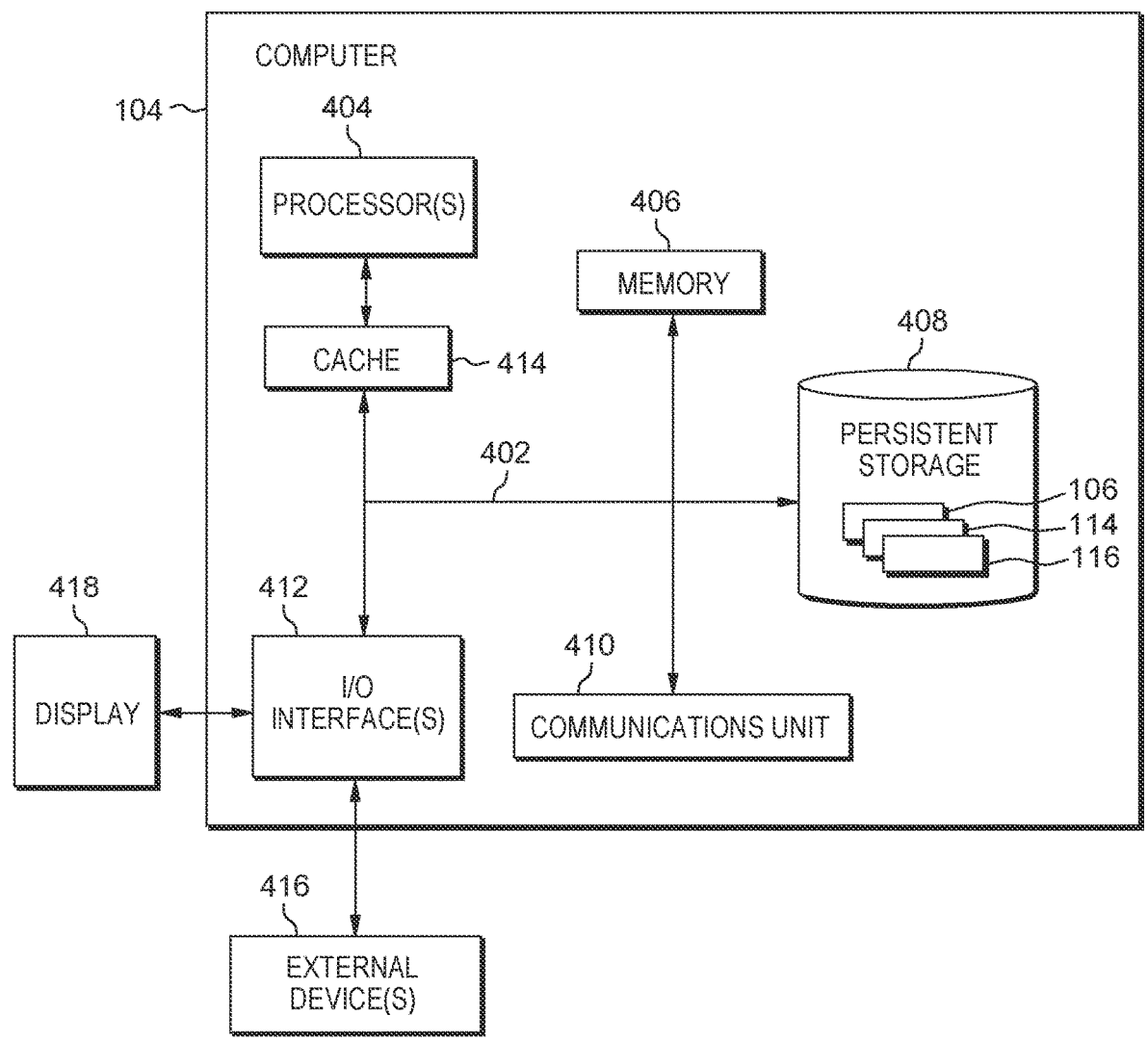
FIG. 4 depicts a block diagram of components of the server computer executing the terms interpretation system within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 104 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., terms interpretation system 106, consent database 114, and terms database 116, are stored in persistent storage 408 for execution and/or access by one or more of the respective processor(s) 404 of server computer 104 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 118. In these examples, communications unit 410 includes one or more network interface cards. Communications unit 410 may provide communications through the use of either or both physical and wireless communications links. Terms interpretation system 106, consent database 114, terms database 116, and other programs and data used for implementation of the present invention, may be downloaded to persistent storage 408 of server computer 104 through communications unit 410.

I/O interface(s) 412 allows for input and output of data with other devices that may be connected to server computer 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., terms interpretation system 106, consent database 114, and terms database 116 on server computer 104, can be stored on such portable computer readable storage media and can be loaded onto persistent storage 408 via I/O interface(s) 412. I/O interface(s) 412 also connect to display 418.

Display 418 provides a mechanism to display data to a user and may be, for example, a computer monitor. Display 418 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more computer processors, a terms of use agreement from a data source;
   receiving, by one or more computer processors, an explicit request for interpretation of the terms of use agreement from a user, wherein the terms of use agreement requires consent from the user, and wherein a manner in which the explicit request is provided is based on how the terms of use agreement is presented to the user;
   determining, based on receiving the explicit request for interpretation of the terms of use agreement from the user, information related to the user and using that information to interpret one or more terms of the terms of use agreement;
   categorizing, by one or more computer processors, the terms of use agreement into one or more categories based on a type of data source of the terms of use agreement;
   ranking, by one or more computer processors, one or more words in the terms of use agreement based on the categorization and on one or more additional terms of use agreements of the type of data source;
   generating, by one or more computer processors, a summary of the terms of use agreement based on the ranking;
   displaying, by one or more computer processors, the summary of the terms of use agreement to the user;
   receiving, by one or more computer processors, input associated with the consent to the terms of use agreement from the user; and
   storing, by one or more computer processors, the input.

2. The computer-implemented method of claim 1, further comprising:
   determining, by one or more computer processors, a location of the user; and
   determining, by one or more computer processors, one or more applicable requirements based on the location of the user, wherein the one or more applicable requirements are associated with the terms of use agreement.

3. The computer-implemented method of claim 1, wherein generating the summary of the terms of use agreement comprises:
   determining, by one or more computer processors, a preferred language of the user; and
   generating, by one or more computer processors, the summary of the terms of use agreement in the preferred language of the user.

4. The computer-implemented method of claim 1, further comprising:
   determining, by one or more computer processors, the user provided consent to a previous version of the terms of use agreement;
   retrieving, by one or more computer processors, the previous version of the terms of use agreement;
   comparing, by one or more computer processors, the previous version of the terms of use agreement to the terms of use agreement; and
   highlighting, by one or more computer processors, in the summary one or more differences between the terms of use agreement and the previous version of the terms of use agreement.

5. The computer-implemented method of claim 1, wherein ranking the terms of use agreement based on the categorization and on the one or more additional terms of use agreements of the type of data source further comprises:
   clustering, by one or more computer processors, the one or more words in the terms of use agreement and one or more words of the one or more additional terms of use agreements of the type of data source;
   based on the clusters of the one or more words in the terms of use agreement, identifying, by one or more computer processors, one or more patterns of similarity in the terms of use agreement;
   creating, by one or more computer processors, a normalized distribution of the clusters; and
   based on the normalized distribution of the clusters, ranking, by one or more computer processors, the one or more words in the terms of use agreement by importance for the user to review.

6. The computer-implemented method of claim 1, wherein receiving the explicit request for interpretation of the terms of use agreement from the user further comprises:
   determining, by one or more computer processors, an application platform upon which the user received the terms of use agreement; and
   determining, by one or more computer processors, a type of device on which the user received the terms of use agreement.

7. The computer-implemented method of claim 1, wherein categorizing the terms of use agreement further comprises:
   retrieving, by one or more computer processors, one or more additional terms of use agreements from one or more types of data source;
   creating, by one or more computer processors, the one or more categories of the one or more additional terms of use agreements; and
   assigning, by one or more computer processors, the terms of use agreement to at least one of the one or more categories using one or more text classification techniques.

8. A computer program product comprising:
   one or more computer readable storage media and program instructions collectively stored on the one or more computer readable storage media, the stored program instructions comprising:
      program instructions to receive a terms of use agreement from a data source;
      program instructions to receive an explicit request for interpretation of the terms of use agreement from a user, wherein the terms of use agreement requires consent from the user, and wherein a manner in which the explicit request is provided is based on how the terms of use agreement is presented to the user;
      program instructions to determine, based on receiving the explicit request for interpretation of the terms of use agreement from the user, information related to the user and using that information to interpret one or more terms of the terms of use agreement;
      program instructions to categorize the terms of use agreement into one or more categories based on a type of data source of the terms of use agreement;
      program instructions to rank one or more words in the terms of use agreement based on the categorization and on one or more additional terms of use agreements of the type of data source;
      program instructions to generate a summary of the terms of use agreement based on the ranking;
      program instructions to display the summary of the terms of use agreement to the user;
      program instructions to receive input associated with the consent to the terms of use agreement from the user; and
      program instructions to store the input.

9. The computer program product of claim 8, the stored program instructions further comprising:
   program instructions to determine a location of the user; and
   program instructions to determine one or more applicable requirements based on the location of the user, wherein the one or more applicable requirements are associated with the terms of use agreement.

10. The computer program product of claim 8, wherein the program instructions to generate the summary of the terms of use agreement comprise:
    program instructions to determine a preferred language of the user; and
    program instructions to generate the summary of the terms of use agreement in the preferred language of the user.

11. The computer program product of claim 8, the stored program instructions further comprising:
    program instructions to determine the user provided consent to a previous version of the terms of use agreement;
    program instructions to retrieve the previous version of the terms of use agreement;
    program instructions to compare the previous version of the terms of use agreement to the terms of use agreement; and
    program instructions to highlight in the summary one or more differences between the terms of use agreement and the previous version of the terms of use agreement.

12. The computer program product of claim 8, wherein the program instructions to rank the terms of use agreement based on the categorization and on the one or more additional terms of use agreements of the type of data source comprise:
    program instructions to cluster the one or more words in the terms of use agreement and one or more words of the one or more additional terms of use agreements of the type of data source;
    based on the clusters of the one or more words in the terms of use agreement, program instructions to identify one or more patterns of similarity in the terms of use agreement;
    program instructions to create a normalized distribution of the clusters; and
    based on the normalized distribution of the clusters, program instructions to rank the one or more words in the terms of use agreement by importance for the user to review.

13. The computer program product of claim 8, wherein the program instructions to receive the explicit request for interpretation of the terms of use agreement from the user comprise:
    program instructions to determine an application platform upon which the user received the terms of use agreement; and
    program instructions to determine a type of device on which the user received the terms of use agreement.

14. The computer program product of claim 8, wherein the program instructions to categorize the terms of use agreement comprise:
    program instructions to retrieve one or more additional terms of use agreements from one or more types of data source;
    program instructions to create the one or more categories of the one or more additional terms of use agreements; and
    program instructions to assign the terms of use agreement to at least one of the one or more categories using one or more text classification techniques.

15. A computer system comprising:
    one or more computer processors;
    one or more computer readable storage media;
    program instructions collectively stored on the one or more computer readable storage media for execution by at least one of the one or more computer processors, the stored program instructions comprising:

program instructions to receive a terms of use agreement from a data source;

program instructions to receive an explicit request for interpretation of the terms of use agreement from a user, wherein the terms of use agreement requires consent from the user, and wherein a manner in which the explicit request is provided is based on how the terms of use agreement is presented to the user;

program instructions to determine, based on receiving the explicit request for interpretation of the terms of use agreement from the user, information related to the user and using that information to interpret one or more terms of the terms of use agreement;

program instructions to categorize the terms of use agreement into one or more categories based on a type of data source of the terms of use agreement;

program instructions to rank one or more words in the terms of use agreement based on the categorization and on one or more additional terms of use agreements of the type of data source;

program instructions to generate a summary of the terms of use agreement based on the ranking;

program instructions to display the summary of the terms of use agreement to the user;

program instructions to receive input associated with the consent to the terms of use agreement from the user; and program instructions to store the input.

16. The computer system of claim 15, the stored program instructions further comprising:

program instructions to determine a location of the user; and program instructions to determine one or more applicable requirements based on the location of the user, wherein the one or more applicable requirements are associated with the terms of use agreement.

17. The computer system of claim 15, the stored program instructions further comprising:

program instructions to determine the user provided consent to a previous version of the terms of use agreement;

program instructions to retrieve the previous version of the terms of use agreement;

program instructions to compare the previous version of the terms of use agreement to the terms of use agreement; and program instructions to highlight in the summary one or more differences between the terms of use agreement and the previous version of the terms of use agreement.

18. The computer system of claim 15, wherein the program instructions to rank the terms of use agreement based on the categorization and on the one or more additional terms of use agreements of the type of data source comprise:

program instructions to cluster the one or more words in the terms of use agreement and one or more words of the one or more additional terms of use agreements of the type of data source;

based on the clusters of the one or more words in the terms of use agreement, program instructions to identify one or more patterns of similarity in the terms of use agreement;

program instructions to create a normalized distribution of the clusters; and based on the normalized distribution of the clusters, program instructions to rank the one or more words in the terms of use agreement by importance for the user to review.

19. The computer system of claim 15, wherein the program instructions to receive the explicit request for interpretation of the terms of use agreement from the user comprise:

program instructions to determine an application platform upon which the user received the terms of use agreement; and program instructions to determine a type of device on which the user received the terms of use agreement.

20. The computer system of claim 15, wherein the program instructions to categorize the terms of use agreement comprise:

program instructions to retrieve one or more additional terms of use agreements from one or more types of data source;

program instructions to create the one or more categories of the one or more additional terms of use agreements; and program instructions to assign the terms of use agreement to at least one of the one or more categories using one or more text classification techniques.

\* \* \* \* \*